United States Patent [19]

Rocha et al.

[11] 4,159,462

[45] Jun. 26, 1979

[54] ULTRASONIC MULTI-SECTOR SCANNER

[75] Inventors: Henry A. F. Rocha, Schenectady; Charles E. Thomas, Scotia, both of N.Y.

[73] Assignee: General Electric Company, Schenectady, N.Y.

[21] Appl. No.: 825,528

[22] Filed: Aug. 18, 1977

[51] Int. Cl.² .............................................. G01S 9/68
[52] U.S. Cl. ..................................... 340/1 R; 73/626
[58] Field of Search ................ 340/1 R; 73/620, 626

[56] References Cited

U.S. PATENT DOCUMENTS

| 3,919,683 | 11/1975 | Itamura et al. | 340/1 R |
| 4,030,343 | 6/1977 | Lund et al. | 73/626 |
| 4,075,598 | 2/1978 | Takamizawa et al. | 340/1 R |

*Primary Examiner*—T. H. Tubbesing

*Attorney, Agent, or Firm*—Donald R. Campbell; Joseph T. Cohen; Marvin Snyder

[57] ABSTRACT

A steered beam B-scan ultrasonic imaging system has a linear transducer array divisible into multiple sub-arrays of transducer elements each operable to perform a sector scan, with the origin points displaced longitudinally along the array between sector scans. The system performs overlapping sector scans and is capable of imaging randomly oriented specularly reflecting targets. Time delays in the transmitting and receiving channels to steer the transmitted beam and to focus the received echoes are provided by digital techniques, by reversible digital shift registers, or by charge coupled device delay lines. The multiple sector image is displayed in real time in an intensity versus displacement format on a cathode ray tube.

14 Claims, 15 Drawing Figures

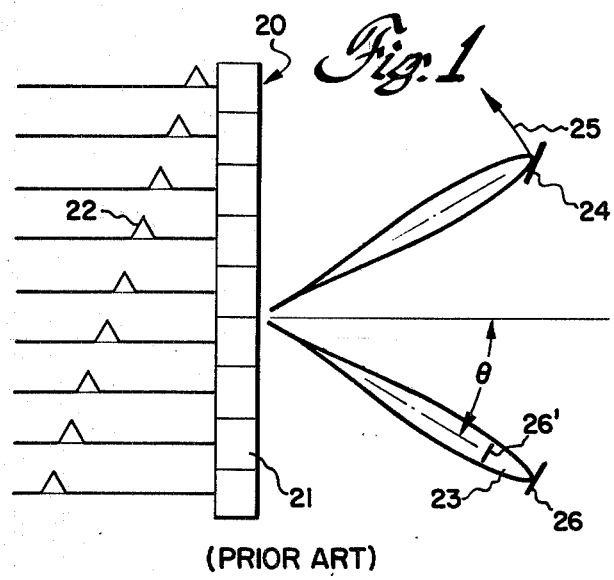
Fig. 1 (PRIOR ART)
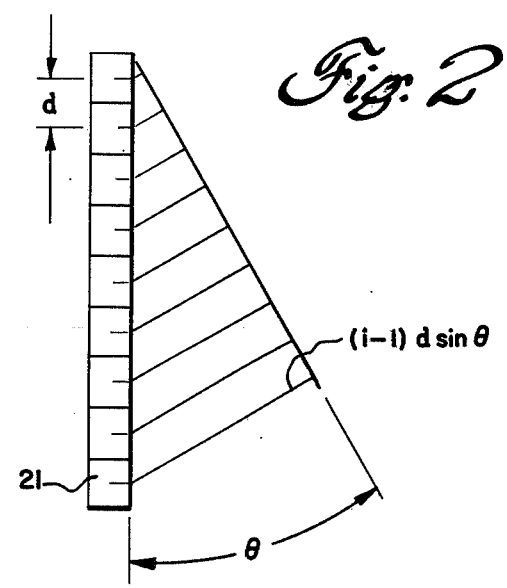
Fig. 2
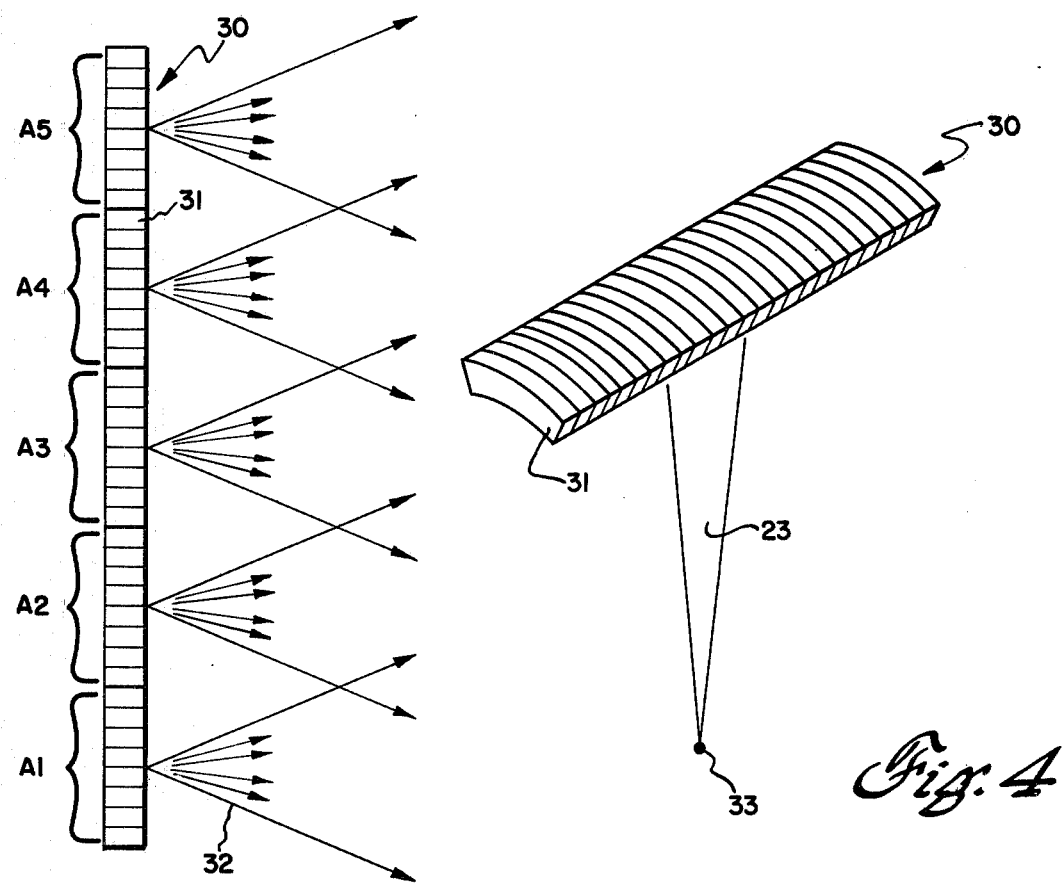
Fig. 3
Fig. 4

ULTRASONIC MULTI-SECTOR SCANNER

BACKGROUND OF THE INVENTION

This invention relates to reflective ultrasonic imaging systems, and more particularly to a steered beam multi-sector ultrasonic scanner and imager with real-time display capability.

Most B-scan ultrasonic systems in medical operations utilize a manually held transducer that is slowly translated along a chosen path, at the same time being rotated in the scan plane. These instruments have the two basic disadvantages of slow operation and poor repeatibility.

A cardiac scanner developed by F. L. Thurstone et al is based on the phased array and electronic focusing techniques proposed by V. G. Welsby et al. This single-sector steered beam instrument has a linear transducer array and generates an acoustic beam oscillating over a 60° sector centered on the midpoint of the array. Real-time images at 20 frames/sec. are produced, but the system is hampered in the detection of specularly reflecting targets. This device is explained in the article "A New Ultrasound Imaging Technique Employing Two-Dimensional Electronic Beam Steering" by Thurstone and von Ramm, *Acoustical Holography*, Vol. 5, 1974, Plenum Press, New York, pp. 249-259. The basic limitation of this technique resides in the fact that for a given relfecting surface each point is insonified in only one direction defined by the line from the point to the center of the array. The probability of proper display of a randomly oriented surface increases when each point of the surface is scanned from different directions. This requires moving the origin of the scanning sector.

SUMMARY OF THE INVENTION

A multi-sector scanner high speed acoustic imaging system capable of displaying improved real time images of specular and scattering targets uses an electronically controlled sharp acoustic beam to make a multiplicity of overlapping sector scans, with the origin point of the sector displaced longitudinally along a linear transducer array between sector scans. The angulated acoustic beams are incident on interior targets at many angles to improve reception of specular reflections. The system further includes a storage type display arrangement such as a high persistence cathode ray tube on which the image is effectively built up scan line by scan line and sector by sector to form one frame, and the entire process is repeated at a typical frame rate of 30 frames per second.

The linear transducer array has a plurality of equally spaced electroacoustic elements divisible into multiple sub-arrays of contiguous active elements with centers or origin points displaced by any multiple of the element-to-element spacing. A separate receiving array is possible but not preferred. A select switch matrix connects the sub-arrays or subsets of elements in sequence to a plurality of transmitting and receiving channels for generating element excitation pulses after predetermined time delays and for delaying the received echo electrical signals by predetermined time delays. The time delays are controlled in the several channels to steer (or steer and electronically focus) the transmitted acoustic beams at multiple angles relative to the normal to the sub-array and also to focus the received echoes originating at all points in the image plane. The delayed echo signals for the plural channels are summed and then processed for visual display in an intensity versus displacement format along a line directed at the same angle as the acoustic beam.

In one embodiment and modification thereof the number of electronic channels is the same as the number of sub-array elements and the sector select switch matrix is configured to connect sub-arrays that are nonoverlapping or are overlapping. Another embodiment with a simpler switch matrix has one electronic channel per array element. A third embodiment to facilitate real time imaging has a transmitting sub-array with fewer elements than the receiving sub-array, so that the directivity of the transmitting array is broader than the directivity of the receiving array, with parallel receiving channels and different time delay controls for each sub-array element. A plurality of image scan lines are displayed covering the region insonified by one transmitting beam. Several transmitting channel and receiving channel configurations are given to attain selectable and different time delays in the plural channels, one using a preset digital timer and digitally selected analog delay elements with an interconnecting switch matrix. A second configuration includes a reversible digital shift register in which the delay increment is varied by changing the scan pulse repetition frequency. A third uses sets of different length analog charge coupled device (CCD) delay lines clocked at different frequencies. Medical applications are in cardiology and laminography, and there are also industrial applications.

BRIEF DESCRIPTION OF THE DRAWINGS

FIG. 1 is a sketch illustrating operation of a prior art single-sector steered beam ultrasonic scanner;

FIG. 2 is a diagram for explaining change of angulation of the steered beam by varying time delays in FIG. 1;

FIG. 3 is a schematic side view of the linear transducer array for the multisector scanner according to the invention showing a five sector scan;

FIG. 4 is a perspective view of a linear transducer array which is curved for transverse focusing;

DESCRIPTION OF THE PREFERRED EMBODIMENTS

Figure 5:
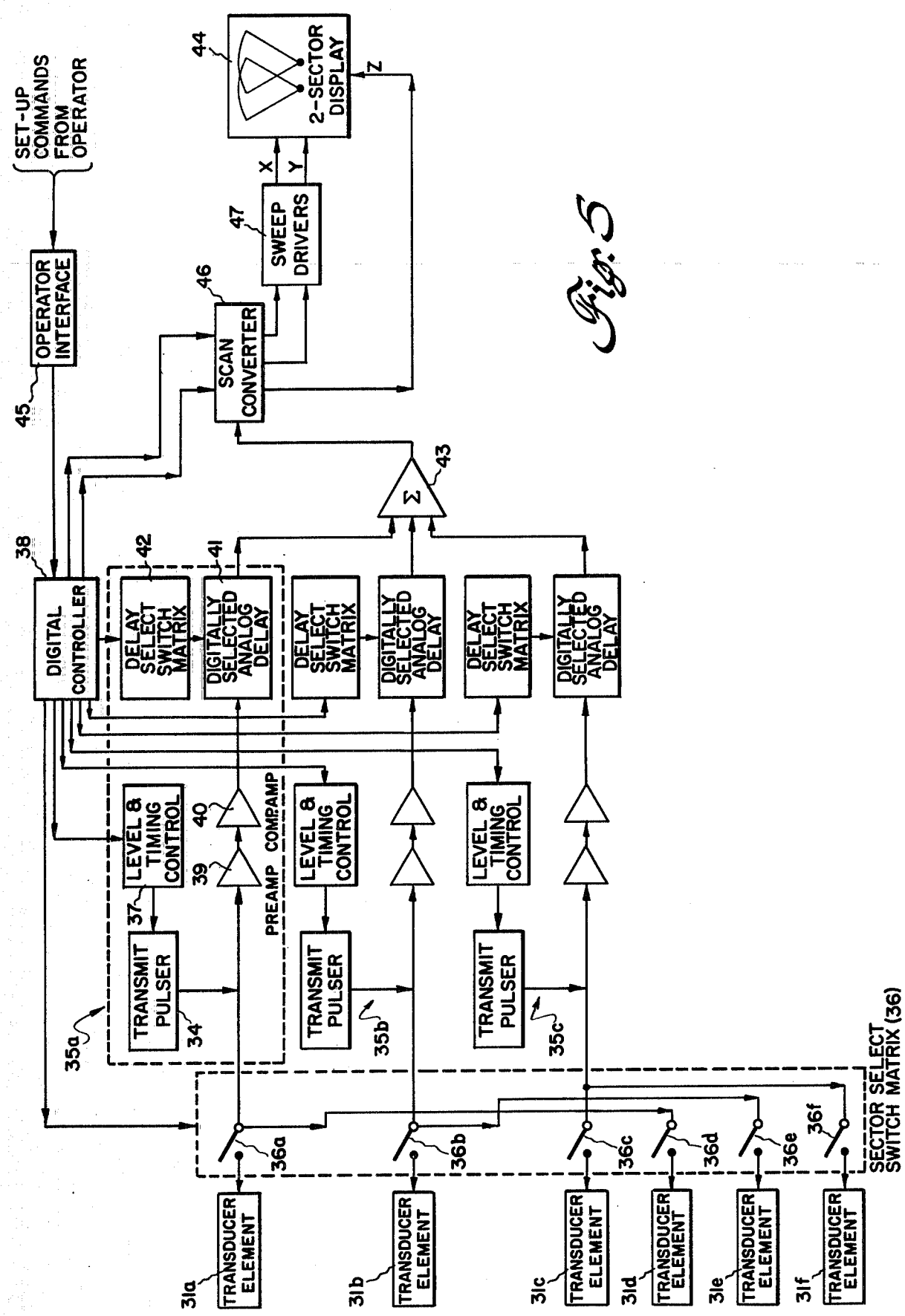
FIG. 5 is a system functional block diagram of a two-sector scan ultrasonic imager with a three transducer element beamformer.

The prior art single-sector steered beam ultrasonic scanner in FIG. 1 has a linear transducer array 20 comprising equally spaced elementary transducers 21 which are energized by excitation pulses 22 in a linear time sequence to form an ultrasonic beam 23 and direct the beam in a preselected azimuth direction to transmit a pulse of ultrasound. In order to steer the beam electronically to an angle $\theta$ degrees from the normal to the array longitudinal axis, a time delay increment:

$$T_i = (i-1)d \sin \theta / C \quad (1)$$

is added successively to each i th element signal as one moves down the array from one end ($i=0$) to the other ($i=1$) to exactly compensate for the propagation path time delay differences that exist under plane wave (Fraunhofer) conditions. By progressively changing the time delay between successive excitation pulses, the angle $\theta$ at one side of the normal is changed by increments. To form and steer the beam at the other side of the normal, the timing of excitation pulses 22 is reversed so that the bottom transducer in FIG. 1 is energized first and the top transducer is energized last. The total sector scan angle is approximately 60° to 90°. Echoes returning from targets in the direction of the sharp transmitted beam arrive at the transducer elements at different times necessitating relative delaying of the received echo electrical signals by different amounts so that all the signals from a given point target are summed simultaneously by all elements of the array. This is evident in FIG. 2 which illustrates the far field condition for a received wave front. For further information see "Electronic Scanning of Focused Arrays" by V. G. Welsby, *Journal of Sound Vibration* (1968) Vol. 8, No. 3, pps. 390–394. The magnitudes of the time delays of the individual echo electrical signals are the same as during the transmission operation to compensate for acoustic path propagation delay differences. The linear transducer array is also referred to as a phased array.

In B-scan imaging, focusing is not necessary to form an image, but it can improve image quality by increasing resolution and reducing artifact problems. It can be provided by using focused or shaped transducers or by electronic focusing. Electronic focusing, like beam steering, is accomplished by the use of channel-to-channel electronic signal delay differences to compensate for propagation path time delay differences from the focal point to the various individual array element positions. The electronic focusing delay increment for each sub-array is given by:

$$T_k = \frac{a^2}{2fc} \left[ 1 - \left(\frac{x_k}{a}\right)^2 \right] \quad (2)$$

where:
 a=the sub-array half aperture distance,
 f=the focal distance,
 c=the sonic velocity,
 $x_k$=the distance from the sub-array center to the k th element, and
 $T_k$=the time delay associated with the k th element.
It has been shown that the beam steering and focusing time delays are additive, i.e., if one applies the time delay set required to steer the beam to an angle $\theta$ and then adds the time delay set required to focus at a range R, the focal point will be located at range R measured along an axis $\theta$ degrees from the normal to the longitudinal axis of the sub-array. The receiving focus, unlike the transmitting focus, can be dynamically changed to track the range from which echoes are being received during the reception period by a multi-step approximation. The additive nature of steering and focusing time delay sets is an approximation that is good except at short ranges. In either case, with or without electronic focusing, the in-phase, delayed echo signals are fed to a summing amplifier and the resulting signal controls the intensity of a cathode ray tube display device. The single circular sector image is formed in real time. One problem with the single-sector scanner is that some specular targets such as 24 in FIG. 1 are oriented such that the reflected echo (indicated by arrow 25) is not detected by linear array 20. Another problem is that a target such as 26 closely spaced behind another target 26' along a given scan line may not be imaged because of the shadowing effect of the target 26'.

Referring to FIG. 3, the ultrasonic multi-sector scanner according to the invention employs a long linear transducer array 30 with a total number of elementary transducers 31 considerably greater than the number required to scan a single sector as previously explained. Each image frame is made of a multiplicity of sector scans, with the origin point of the sector laterally displaced between sector scans. This requires an array of transducer elements longer than the sub-array used at any one time for beamforming and also a long persistence time cathode ray tube or other storage type display device on which the total image is built up scan line by scan line and sector by sector. The first sub-array A1 of transducer elements is used first to form the beam which is steered or steered and focused to generate the first sector sub-frame of the composite image. Typically, the ultrasound beam is rotated by small angular increments in the counterclockwise direction toward the normal, while alternately forming individual scan lines 32, and then the beam is rotated by increments in the clockwise direction toward the normal to make up additional scan lines. Then a second sub-array A2 of transducer elements with its center laterally displaced along the array is energized to form another beam and build up a second sector sub-frame of the composite image. This process is repeated for sub-arrays A3, A4, and A5 until the entire image frame is complete. The number of sub-arrays can be two or more, subject to the considerations discussed later, and the sub-arrays may overlap or not overlap. The array center displacement increment between sector scans can be any multiple of the basic array element center-to-center spacing. Since the echo data is sensed, processed, and converted to a visual display in real time, many different sequences of forming the scan lines are possible, such as selecting a beam angulation and forming the scan line in each sub-array with that angulation, changing the programmed time delays incrementally and forming the scan lines for each sub-array at the new beam angulation, and so on.

The multi-sector scanner or "walking beam" system is a multi-directional acoustic scanning system capable of detecting and imaging randomly oriented specular targets. The advantage of the multi-sector scanner, however, is not confined to the increase in total aperture, which improves reception of specular reflections.

It also provides compounding which further improves reception of specular reflections and increases use of the high resolution in depth, reducing reliance on the lower resolution in the lateral direction (at long range). The multi-sector scanner has both industrial and medical applications, but is especially useful in medical diagnostics for cardiology and laminography. To image a portion of the heart, the linear transducer array 30 is manually held against the patient's chest wall while observing the image on the cathode ray tube, and its position changed until the desired portion of the heart is imaged. To prevent blurring of the image by moving parts of the heart, a frame reel of about 30 frames per second is preferred; moreover, the diverging beam geometry of the multi-sector scanner is advantageous for viewing the heart because of the presence of ribs interposed between the transducer array and organ. Elementary transducers 31 are about 0.5 millimeters wide to avoid the formation of side lobes in the beam pattern, and are flat and several wavelengths long, but other sizes are possible. In FIG. 4 the transducer elements are curved to provide for transverse focusing of ultrasound beam 23, and the insonified region within the depth of field at either side of focal point 33 is reasonably in focus.

The several exemplary forms of the invention in FIGS. 5, 8, 9A and 9B, and 10A and 10B accomplish more than a simple conversion of a single-sector scanner to a multi-sector scanner, in that a main objective is the reduction of the overall complexity of the multiple-sector scanner implementation. It does this in some embodiments by a new arrangement for supplying the time delays that steer the beam, and thus is concerned primarily with the sector scan problem that is common to both single- and multiple-sector scanners. FIG. 5 is a system functional diagram of a two-sector scan ultrasonic imager with a three-element beamformer or subarray. The linear transducer array has a total of six transducer elements 31a–31f, and the scanner further has three physically identical transmitting and receiving channels 35a–35c which are time-shared between two sub-arrays by means of a sector select switch matrix 36 having six switches 36a–36f. A practical system could have a total of 32 transducer elements, with 16 contiguous elements used to form the beam for each of the two sectors in the total scan. For this system there are 16 transmitting and receiving channels. However, many other combinations are possible and may be preferable for some applications. Each transmitting channel is comprised by level and timing control circuitry 37 under the control of a digital controller 38 for determining the level and timing of the transmit pulse generated by transmit pulser 34 and applied to one of the transducer elements. The receiving channel for processing the receiving echo electrical signal is comprised by a preamplifier 39 having a limiter, such as a pair of back-to-back diodes, to protect the sensitive preamplifier inputs from the high transmitting voltage, and also a compression amplifier 40 to reduce the larger dynamic acoustic range to the smaller range the display can handle. The amplified echo signal is then fed to a digitally selected analog delay circuit 41 having an associated delay select switch matrix 42 which, under the control of digital controller 38, selects the delay element or elements to delay the echo signal by a predetermined amount. One such arrangement is illustrated in FIG. 7.

The delayed echo signals are fed to a summing amplifier 43 and the summed signal determines the display beam intensity vs. time function, i.e., is the Z control of a cathode ray tube 44. The visual image produced in real time is, of course, a two-sector display. Digital controller 38 can take various forms and can be a hard-wired logic circuit but is preferably a properly programmed minicomputer or microcomputer with an additional function of controlling sector select switch matrix 36 to determine which subset of three switches is open and which is closed to select which of the two possible scan sectors is active. An operator interface functional block 45 is added to FIG. 5 to convey that the operator interacts with the digital controller by entering appropriate set-up commands such as the field of view, number of scan lines per sector, speed, etc. An added function of digital controller 38 is to supply scan line data to a scan converter 46 which in turn controls sweep drivers 47 and the generated X and Y deflection signals for cathode ray tube 44. The function of the scan converter is to convert the X and Y deflection functions of the display to produce a roughly rectangular two-sector display, and another function, requiring that the summed echo signals from summing amplifier 43 be passed through the scan converter, is that where an image point is covered by both sectors, to compare the two echo amplitudes obtained and use the larger of the two amplitudes to control the tube beam intensity. Each angular scan line commanded by digital controller 38 has a unique set of X and Y addresses on the rectangular grid image field, and scan converter 46 has at its output the corresponding X and Y data. It is also possible to operate in the integration mode in that image scan lines are generated one at a time and the echo amplitudes in overlapping areas of both sectors are effectively summed together.

Figure 6:
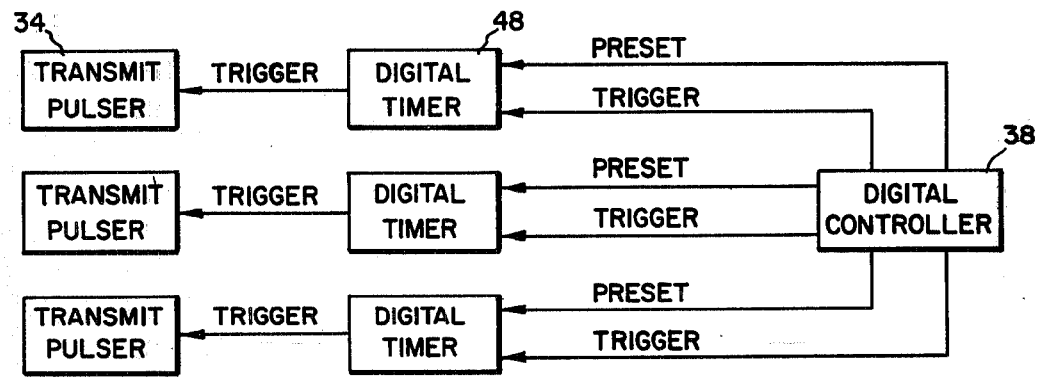
FIG. 6 is a block diagram of one implementation of the transmitting time control function in FIG. 5.

FIG. 6 shows one implementation of the transmitting time control function (block 37 in FIG. 5), although others are possible. Each channel has a digital timer or clock 48 controlled by digital controller or computer/programmer 38, and the timing of the transmit pulse initiation in each channel is determined by the controller through its control of the time out period preset function. A preset signal determines the period to be timed and a trigger signal sets the clock going; a trigger pulse generated at the end of the timed period actuates transmit pulser 34. The timed intervals in the three channels are different whereby the transducers in the sub-array are progressively excited.

Figure 7:
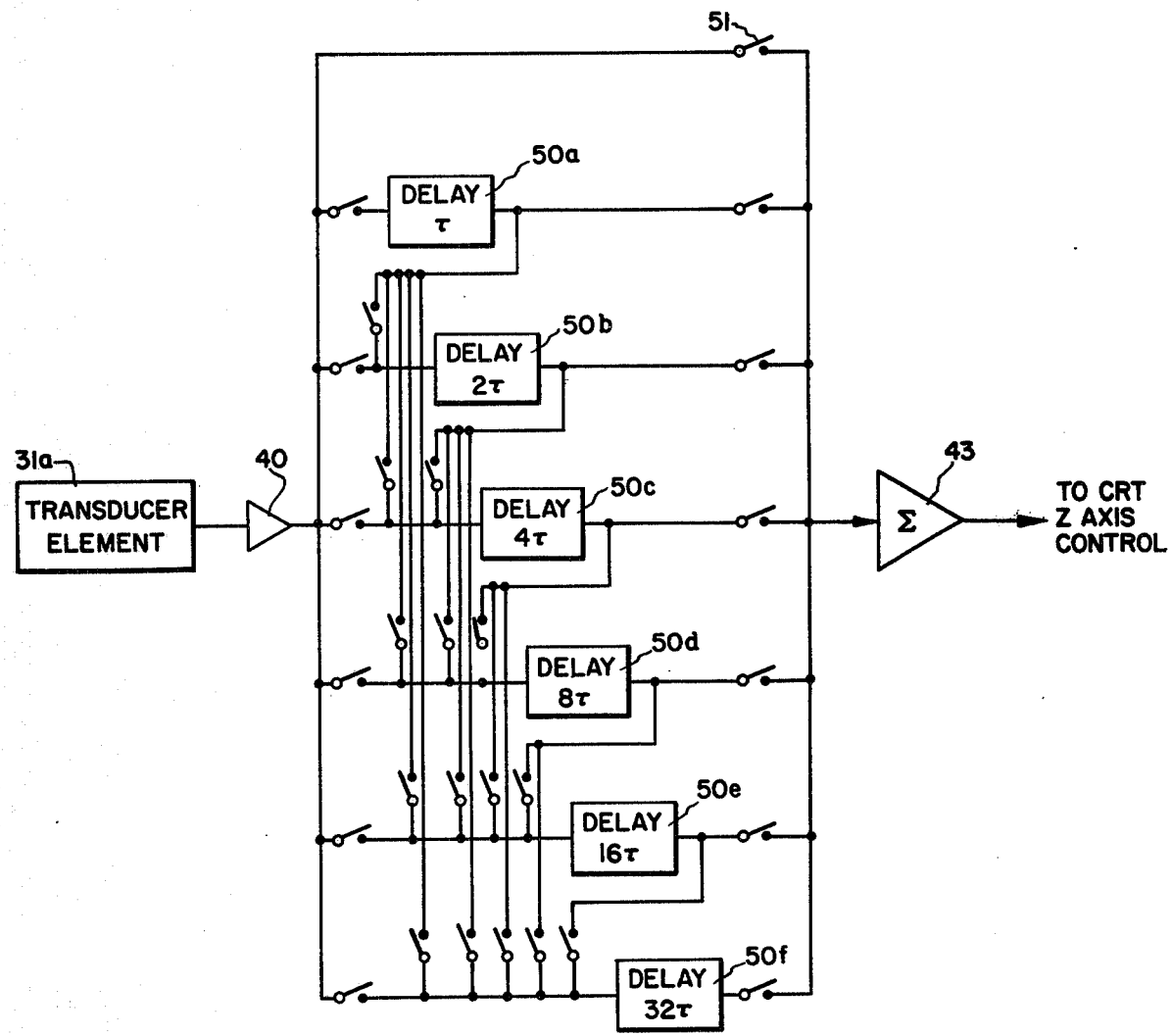
FIG. 7 shows an implementation for FIG. 5 of a receiving beam focusing control with binary-weighted delay lines controlled by a switch matrix.

FIG. 7 illustrates one possible implementation of the digitally selected analog delay and delay select switch matrix (blocks 41 and 42 in FIG. 5) described in general in the prior art. The circuit in each receiving channel includes six binary-weighted analog delay lines 50a–50f connected in parallel branches, and a matrix of analog switches 51, the arrangement being such that 63 different delay times and a zero delay can be set by closing the proper switch or combination of switches. Digital controller 38 controls the delay time set in the three receiving channels.

To briefly review the operation of the two-sector scan ultrasonic imager in FIGS. 5–7, digital controller 38 selects the first sector for scanning by closing switches 36a–36c, thereby connecting the first three transducer elements 31a–31c to the transmitting and receiving channels 35a–35c. The digital controller also determines the level and timing of the transducer excitation by pulser 34 and applied to each element in transmission to control the transmit beam shape and scan angle. The controller presets digital timers 48 and a common trigger pulse is applied to all the clocks with the result that excitation pulses are applied to the transducer elements in time sequence. The digital controller also determines the delays in all the receiver channels, and thus controls the receiving scan angle and/or focal range. This is accomplished by closing switches 51 and connecting different combinations of the delay lines 50a–50f in the three channels to progressively change the amount by which the received echo electrical signals are delayed in each channel. The three delayed echo signals are fed to a summing amplifier 43 and the summed signal varies the beam intensity of cathode ray tube 44. Scan converter 46 in the meantime converts the angulated scan line direction to X and Y deflection signals for the cathode ray tube, compares the summed signal for an image point with other amplitudes for that point and retains the largest amplitude, and reads out the video output data (see FIG. 8 for a particular peak detecting scan converter), whereby an image of the scan line is generated. The timing of the excitation pulses and the time delays in the receiving channels are then changed by increments and the entire process repeated to image the other scan lines in the first sector. The second sector is then selected for scanning by opening switches 36a–36c and closing switches 36d–36f, thereby connecting the last three transducer elements 31d–31f to the transmitting and receiving channels. The sequence of steps for scanning and imaging the first sector is now repeated for the second sector, using identical excitation pulse timing and receiving channel delays for corresponding scan lines. This completes one complete frame of the two-sector display of the insonified region, and the operation is repeated at a rate of 30 frames per second.

Figure 8:
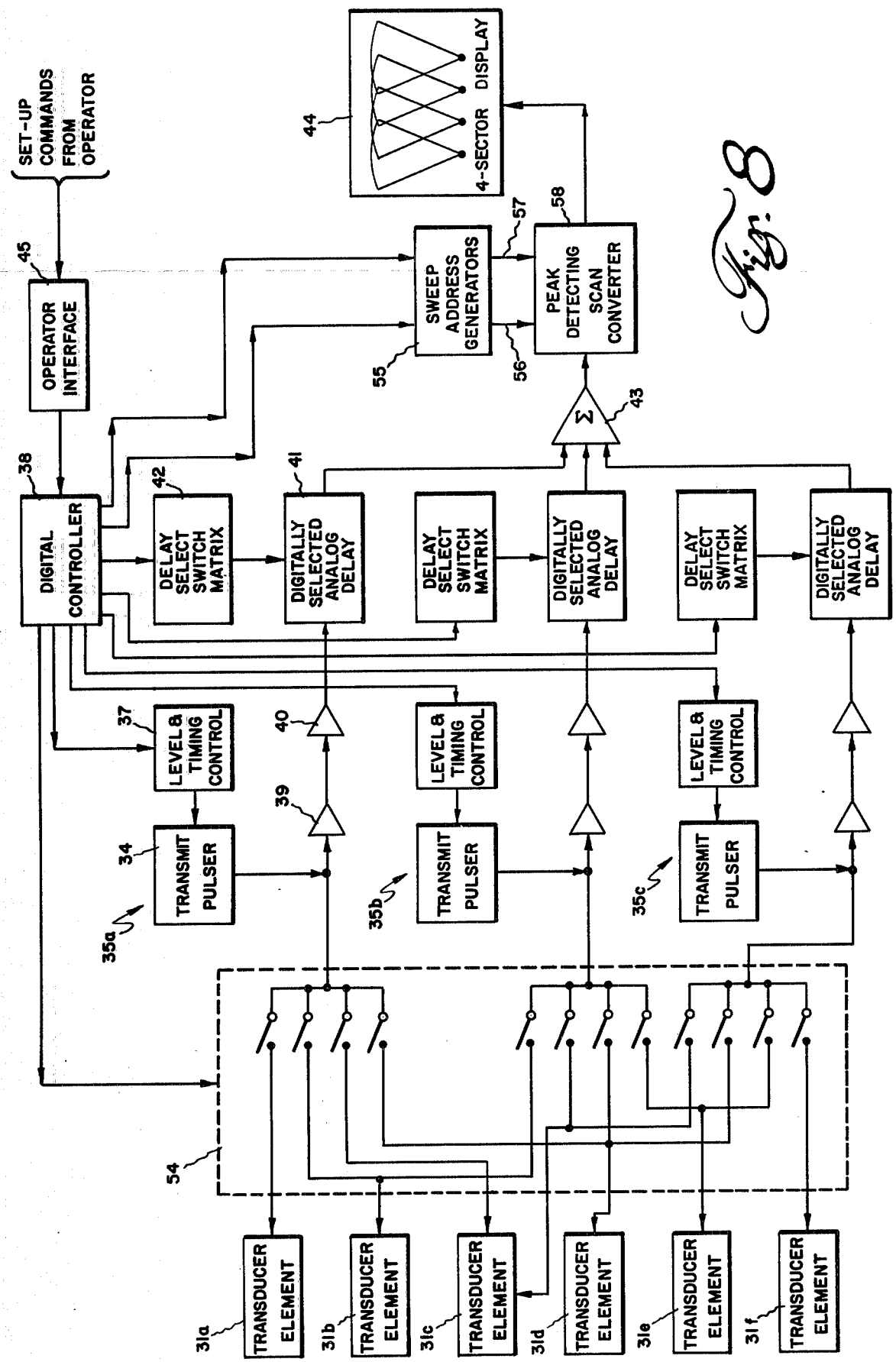
FIG. 8 shows a four-sector scan ultrasonic imager with a three-element beamformer.

FIG. 8 is a functional block diagram of a four-sector scan imager with a three-element beamformer. In this arrangement, realizing that others are possible, each of the four possible contiguous groups of three elements out of the total six-element transducer array is used to scan a sector with a different origin point. The system diagram differs mainly from that of FIG. 5 in the increased complexity of sector select switch matrix 54 and in the shape of the displayed image field, but there are also changes in the digital controller and scan converter blocks. This system includes a peak detecting scan converter by means of which only the largest of the echo signal amplitudes is retained in overlapping areas of the several sector scans and controls the electron beam intensity, but a scan converter with appropriate changes may be preferred to realize an integration mode display. It is evident that transducer elements 31a–31c are connected to transmitting and receiving channels 35a–35c to perform the first sector scan, elements 31b–31d are then connected to the transmitting and receiving channels to perform the second sector scan, and then elements 31c–31e and elements 31d–31f to perform the third or fourth sector scans. The operation is essentially the same as for the two-sector scan, simply adding the third and fourth sectors, and need not be discussed in more detail except as follows.

For the peak reading scan conversion function, digital controller 38 feeds scan line data to sweep address generators 55 and the corresponding X and Y addresses are supplied on lines 56 and 57 to a peak detecting scan converter 58. The summed analog echo signal information from summing amplifier 43 is converted to digital form and stored in a random access memory at the proper X, Y location. Succeeding echo signal at overlapping image points are compared, pixel (picture element) per pixel with the previously stored amplitude, and only the larger is retained. After storage of all the echo signal data, it is read out following completion of the four sector scan while running the X-Y voltages in a raster at TV rates to produce a four-sector visual image on cathode ray tube 44. The peak detecting digital scan converter is disclosed and claimed in a concurrently filed application Ser. No. 825,529 by E. T. Lynk, and assigned to the same assignee as this invention. An alternate type of peak reading scan conversion involves an analog storage tube operated in a peak detection mode, in which the largest signal to be written on the target is the signal finally stored on the target. No accumulation of charge takes place over and above that needed to reflect the largest signal written onto a given part of the target.

Figure 9A:
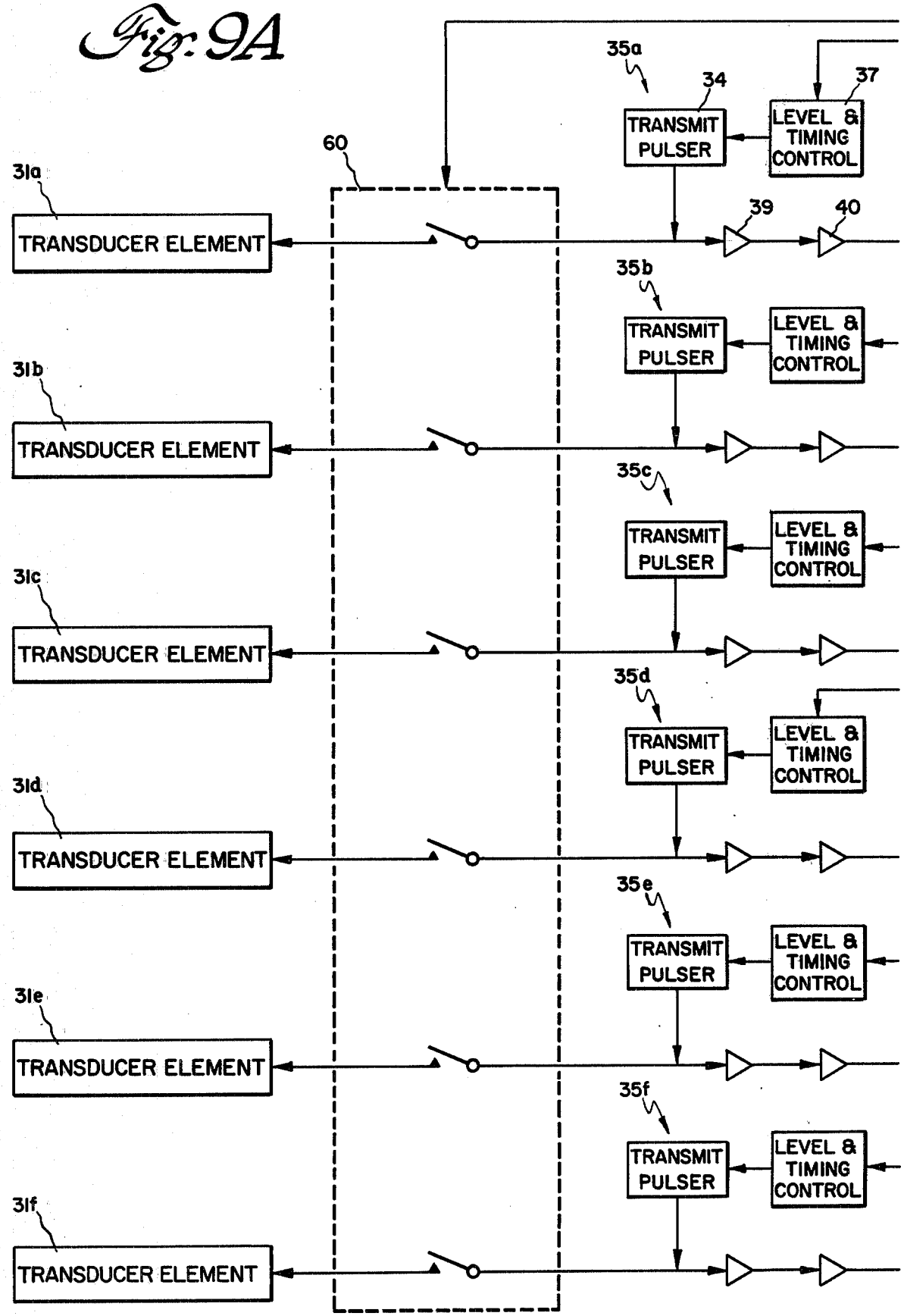
FIGS. 9A and 9B are a modification of FIG. 8 for achieving the same result by simplifying the sector select switch matrix at the expense of doubling the transmit and receive channel circuitry.
Figure 9B:
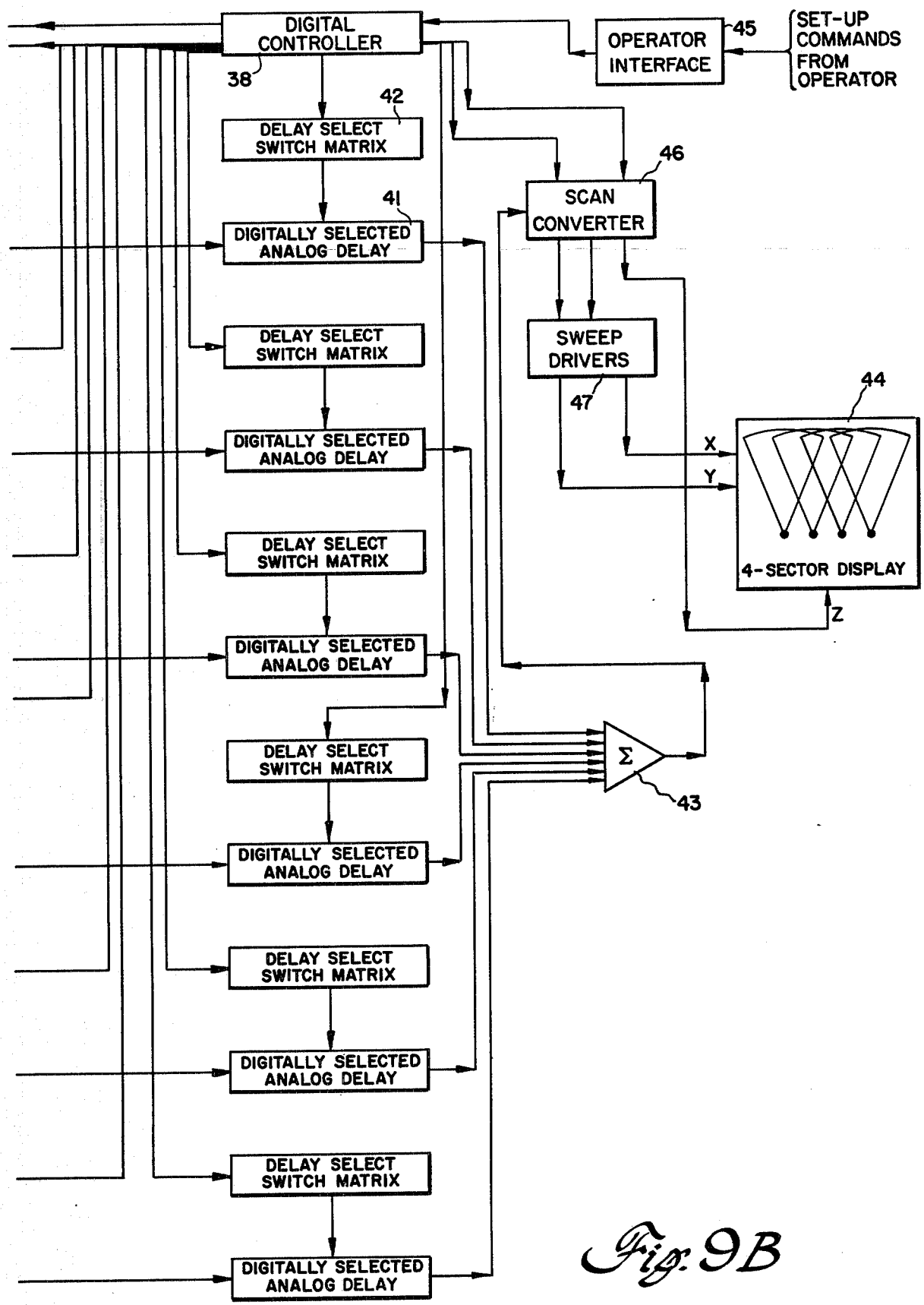

FIGS. 9A and 9B are a modification of FIG. 8 and shows a different possible arrangement to produce the same four-sector scan and image. Here the sector select switch matrix has been greatly simplified, but at the cost of a doubling of the transmit and receive channel circuitry. For the same six transducer elements 31a–31f, there are now six transmitting and receiving channels 35a–35f, and sector select switch matrix 60 connects an element only to the associated channel. The four subarrays are each comprised by three contiguous transducer elements so that the origins of the sector scans are displaced by one transducer element along the longitudinal axis of the linear transducer array. The operation is evident from the discussion of FIG. 8, with the exception that scan converter 46 operates as in FIG. 5. The scan lines in the four-sector display are imaged sequentially in real time to form a single frame, at a rate of 30 frames per second. The order in which the sectors are scanned and imaged, in either four-sector scan ultrasonic imager, makes no difference.

There is a fundamental limitation of reflective ultrasonic imagers that tends to put a limit on the usefulness of the multiple sector "walking beam" techniques in real time cardiac imaging systems. Such systems require relatively high frame rates to prevent motion of heart parts from blurring the image. When, for example, a frame rate of 30 frames per second is used, the total distance sound can travel at 150,000 centimeters per second in tissue in one frame period is about 5000 centimeters. Assuming that a maximum image depth of 20 centimeters is required, then only 125 transmit-receive cycles are possible per frame. In conventional imaging systems, the number of acoustic scan lines is equal to the number of transmit-receive cycles. In a single-sector scan imager, 125 scan lines per sector, covering a total scan angle of about 60° to 90°, is a very reasonable number, but for a five-sector "walking beam" scanner with 60° sectors, the 125 scan lines per frame limit corresponds to a scan angle increment of nearly 3°, not a very satisfactory figure since array beam widths in the order of 1.5° are commonly employed to achieve good lateral resolution. It is clear, then, that the multi-sector scan technique is most suitable for applications where the maximum image depth is small (so propagation time per scan line is short) or the frame rate is low (so there is more time for acoustic propagation per frame). Many such applications exist in medical imaging, and may constitute a majority of all applications. However, for cardiology there may be a need for some technique which will permit increasing the acoustic scan line density for a given frame rate-image depth combination.

A method of accomplishing this is to form the transmitting beams using half as many transducer elements as are used to form the receiving beams, whereby the transmitting beams are twice as wide, in the direction of the longitudinal axis of the transducer array, as the receiving beams. Two parallel receiving channels are provided, each with its own independent gain and time delay control for each receiving array element. The digital controller is directed so that for each transmitted pulse two independently steered receiving beams are simultaneously formed that together cover the regions insonified by the transmitting beam. Thus, two lines of acoustic echo data are obtained on each transmit-receive cycle and the number of acoustic scan lines obtained per frame is doubled. Obviously, this technique can be carried further, but not to the point where all scan lines in a sector are obtained in single transmit-receive period. This is because of certain implementation problems and because of the loss in signal-to-noise ratio involved in using a transmit fan beam that covers an entire sector.

Figure 10A:
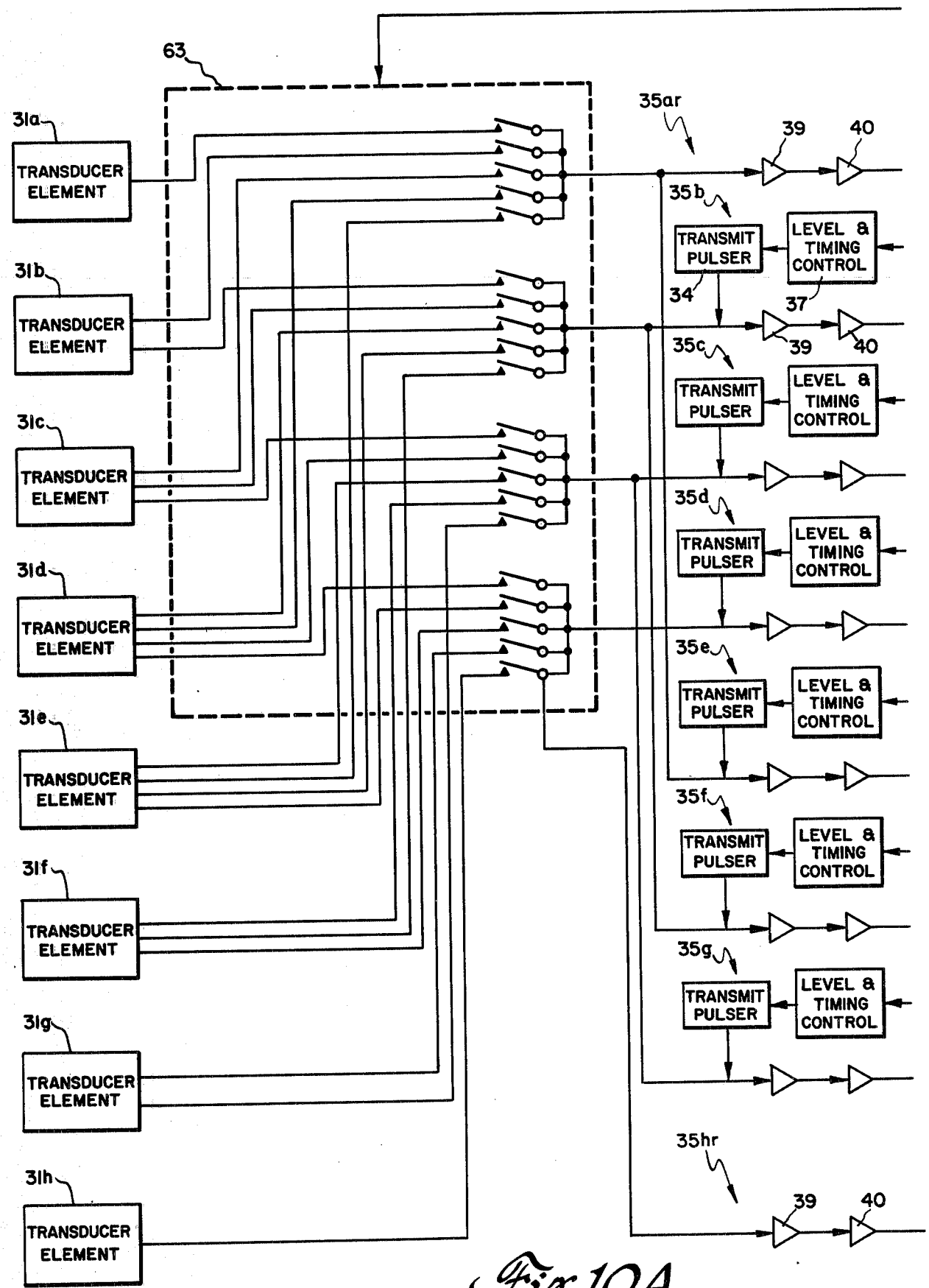
FIGS. 10A and 10B are a system functional diagram of a five-sector scan ultrasonic imager with two simultaneous four-element beamformers.
Figure 10B:
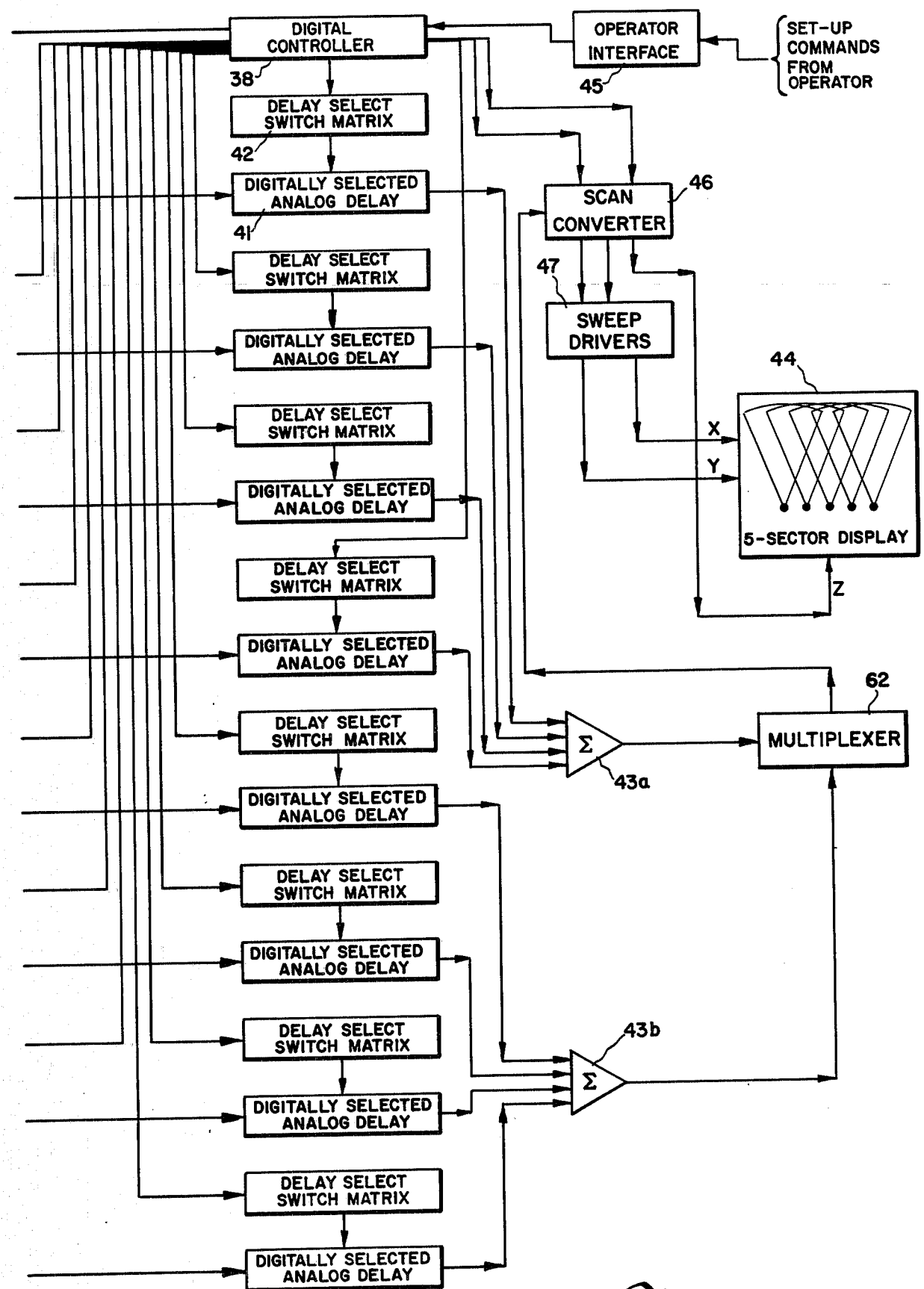

FIGS. 10A and 10B are a system functional diagram of a five-sector scan imager with two simultaneous for-element beamformers. This embodiment shows how the two scan line per cycle concept is implemented in a five-sector scanner using two transducer elements to form each transmitting beam, four elements to form each receiving beam, and eight elements in the total array. The complexity of the reciever channel electronics is comparable to that of FIGS. 9A and 9B and the complexity of the sector select switch matrix is comparable to that of FIG. 8. It also requires a multiplexer to switch the display between the two independent beamformer or summed delayed echo signal lines. For a working system, more practical numbers are in the vicinity of eight elements per transmitting beam, 16 elements per receiving beam, and 32 total array elements.

The five transmitting beam sub-arrays are transducer elements 31b and 31c, 31c and 31d, 31d and 31e, 31e and 31f, and 31f and 31g. The receiving beam sub-array in each case includes the two transmitter elements and the adjacent element on either side, whereby the receiving sub-arrays are elements 31a–31d, 31b–31e, etc. The endmost receiver transducers in the sub-arrays act only as receiver transducers and for this reason two of the electronic channels identified at 35ar and 35hr are receiving channels only, while the other six channels identified at 35b–35g are transmitting and receiving channels like those already described. There are two summing amplifiers, the delayed signals from channels 35ar–35d being fed to summing amplifier 43a, while the delayed echo signals from channels 35e–35hr are fed to summing amplifier 43b. The two summed delayed echo signals pass through a multiplexer 62 to switch the display between the two independent beamformer lines. Sector and beam select switch matrix 63 is comprised of four banks of five switches making a total of 20, arranged such that all eight channels are active for the five sub-array combinations of transducer elements.

A description of the operation of one of the sub-arrays will suffice. Assume that transducer elements 31b and 31c are the transmitter sub-array and that elements 31a–31d are the receiver sub-array. Under the control of digital controller 38, electronic channels 35b and 35c generate excitation pulses time delayed with respect to one another that are applied to elements 31b and 31c, thereby forming a relatively broad, say 3°, ultrasound beam steered at a predetermined azimuth direction. Two independently steered receiving beams are simultaneously formed, each covering an angle of 1.5°, that together cover the regions insonified by a transmitting beam. The first four electronic channels have time delays selected to steer the receiving beam, while the other four electronic channels have a different set of time delays to steer the other receiving beam at a different angle. One summed delay echo signal determines the beam intensity for one image scan line, and the other summed delayed echo signal determines the beam intensity for the other image scan line, so that for every transmit-receive cycle there are now two image components rather than one as before.

Another approach to the same problem of achieving good scan line density would be to use a quasi-real time approach in which each new sector scanned is synchronized with the EKG (electrocardiogram) wave to start at the same phase of the cardiac cycle, and information is gathered over a number of cardiac cycles equal to the number of sectors scanned in a frame.

Figure 11:
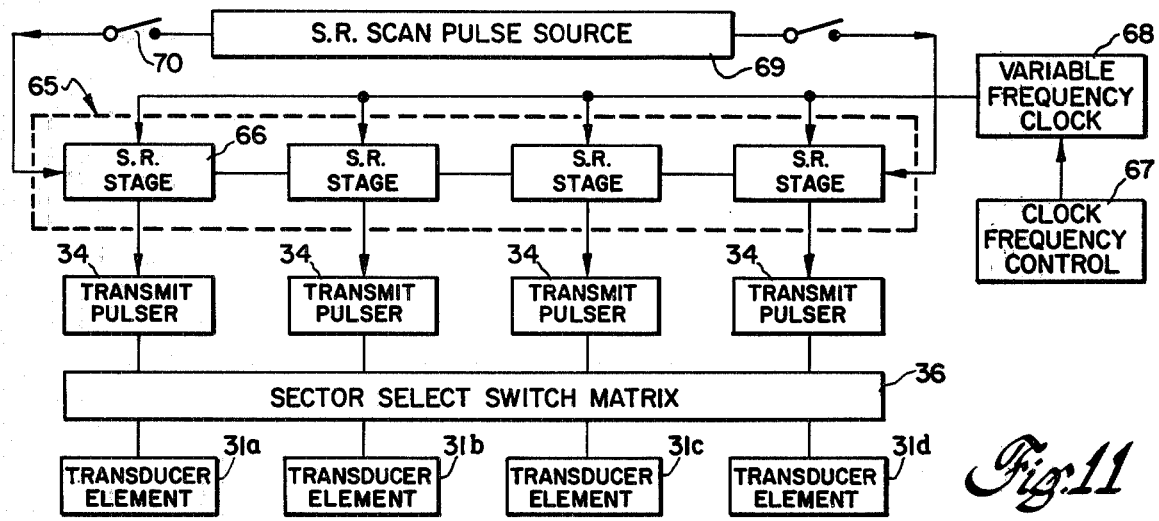
FIG. 11 is a schematic diagram of a simplified transmit pulse timing control having a digital shift register to generate variable incremental time delays for steering but not focusing the transmit beam.

The four embodiments of the multi-sector scanner ultrasonic imaging system in FIGS. 5, 8, 9A and 9B, 10A and 10B all have in common a digitally controlled analog type delay matrix in each receiving channel and a level and timing control in each transmitting channel. Two circuits for implementing these functions have been described in FIGS. 6 and 7. FIG. 11 shows a relatively simple control for transmit pulsers 34 in the several channels for a system in which the transmit beam is steered but not focused. It produces time delays proportional to the position of the transducer element in the array by means a digital shift register. The delay increment from one element to the next is varied by changing the scan pulse repetition frequency, thus changing the transmit beam steering angle. The digital shift register is bidirectional in order to permit steering the beam on either side of the normal. In FIG. 11, digital shift register 65 has a number of stages 66 equal to the number of transmitting channels, and every stage has an output to the pulser 34 in the respective channel. A clock frequency control 67 sets the frequency of the clock pulses generated by variable frequency clock 68 and fed to shift register stages 66. Scan pulses from a source 69, depending upon which of switches 70 is closed, are input to one end of the shift register or the other, and the scan pulse shifts from one stage to the next at a rate determined by the clock pulse frequency. Selection of the clock frequency determines the beam steering angle since the delay at the k th shift register output is k times the clock period and the delay required for the (k+1) th element of a uniformly spaced array is k times the basic d sin θ delay. For focusing purposes, an analog delay would be inserted between each shift register stage 66 and the corresponding transmit pulser 34. The sector select switch matrix is illustrated in FIG. 11 but is not shown in FIGS. 12 and 13 nor are the receiving channel amplifiers.

Figure 12:
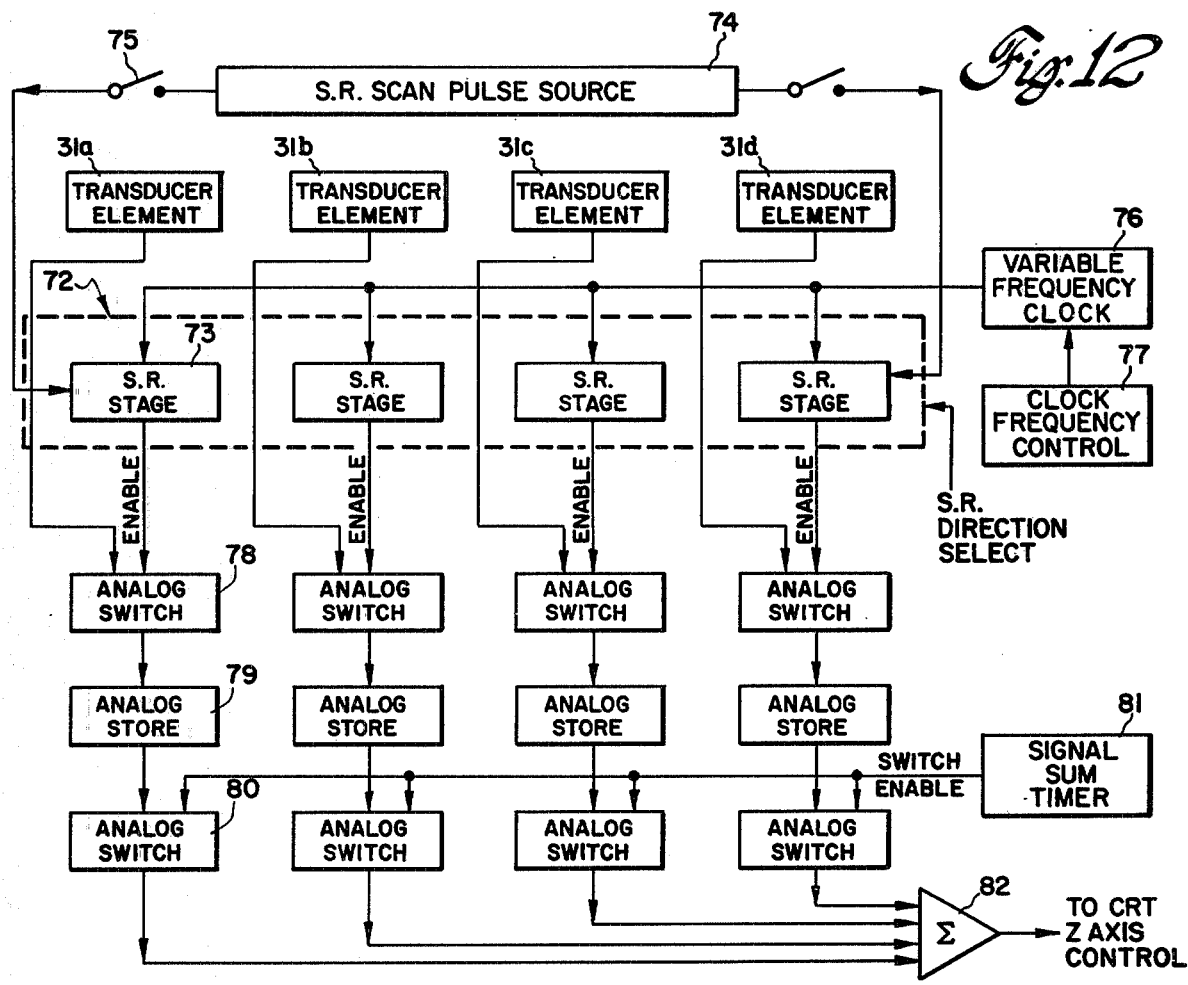
FIG. 12 illustrates a receiving system which scans the focal point across the image at a constant range from the array center which is implemented with a digital shift register and analog switch and storage elements.

A variation of this technique is also used for receiving beam focusing at constant range in another embodiment of the receiving channel as shown in FIG. 12, but analog switches and storage elements are required to reconstruct the composite signal waveform from the individually delayed samples. Digital shift register 72 with a plurality of stages 73 is a different component from the shift register in the transmitting channel, and is reversible to shift in either direction, depending upon whether the scan pulse from source 74 is applied through a switch 75 to one end of the register or the other end. The scan pulse repetition frequency is variable depending upon the frequency of clock pulses generated by a variable frequency clock 76 as determind by clock frequency control 77. The received echo electrical signal is gated by an analog switch 78 to an analog storage or memory element 79 during the interval the corresponding shift register stage 73 is active, the switch being enabled and closed by the on and off transients of the scan pulse. The signal sampling must be at a rate exceeding the Nyquist rate so that the switch open time is much less than the acoustic propagation time equivalent of the desired range resolution. There is no problem of the element-to-element delay requirement exceeding the scan pulse period as long as the element spacing does not greatly exceed the half wavelength criterion required to eliminate grating side lobes. Additional analog switches 80 enabled by a signal sum timer 81 are interposed between storage elements 79 and summing amplifier 82, whereby the echo signal signal samples from the four transducer elements 31a–31d are stored and then read out simultaneously into the summing amplifier. To provide for electronic focusing, an additional analog delay not here illustrated is inserted in each receiving channel between the transducer element and analog switch 78.

Figure 13:
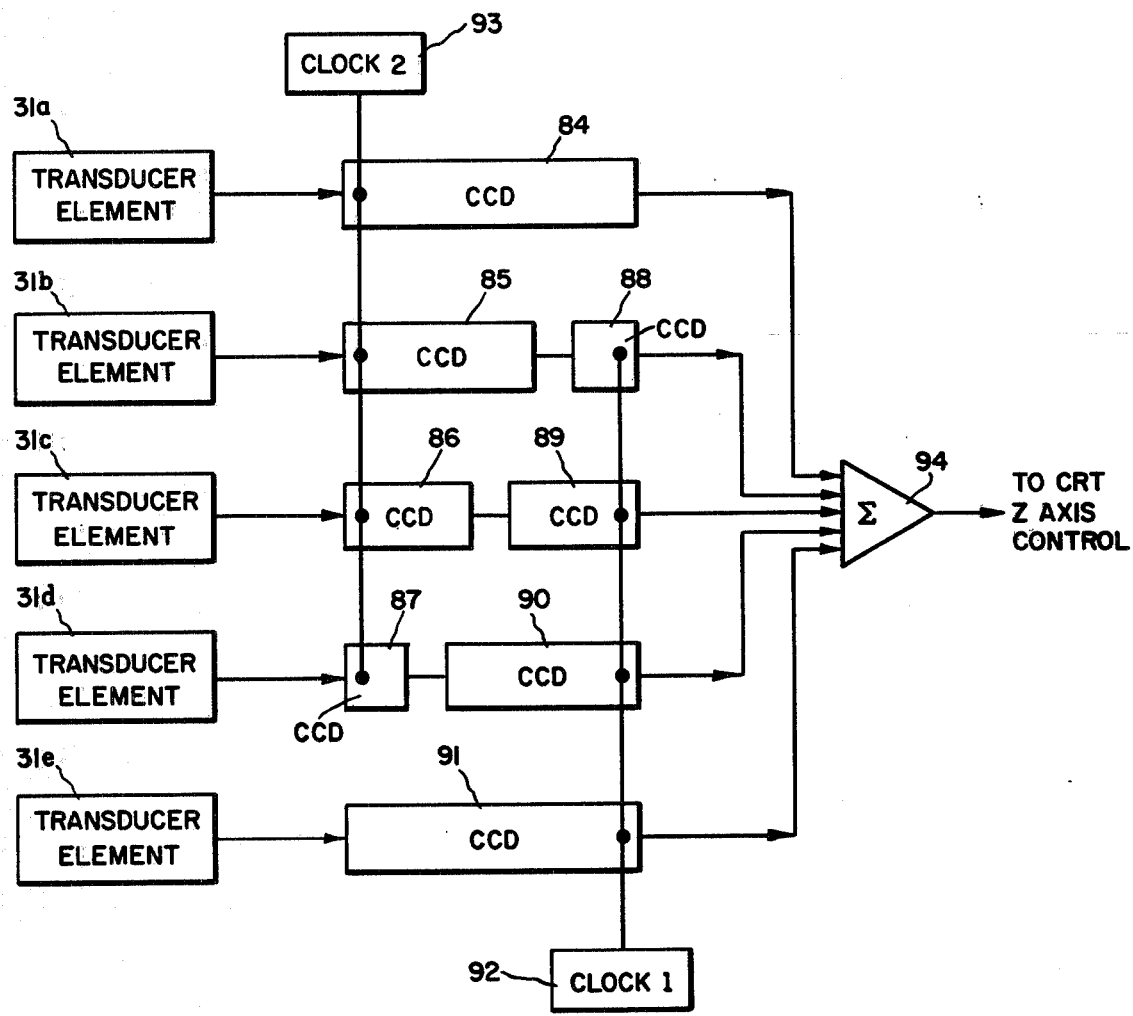
FIG. 13 illustrates another receiving system with the same function as that of FIG. 11 but having an analog storage system using charge coupled device (CCD) storage elements.

The final embodiment in FIG. 13 of a receiving channel with capability for receiving beam focusing at constant range employs a more conventional analog storage system with charge coupled device (CCD) delay lines. For the five individual receiving channels that are shown, there are two sets of linear taper analog CCD delay lines. The one set of delay lines 84–87 in the first four channels are full length, three-quarters length, half length, and one-quarter length, and the other set of delay lines 88–91 in the last four channels are one-quarter length, half length, three-quarters length, and full length. Two clocks 92 and 93, both variable frequency clocks but operating at any one time at different frequencies, supply clock pulses to the two sets of delay lines. In this approach, the received echo electrical signals generated by the transducer elements are sampled simultaneously and clocked out with different time delays to summing amplifier 94. Assuming that the delay line 84 has the shortest delay and delay line 91 the longest, the delays in the intermediate three channels are proportionately between the two extremes, and the time delays are reversible by interchanging the two clock frequencies. This approach is less suitable in the transmitting channels for the beam scanning function, but is sufficiently efficient for consideration in a system that both steers and dynamically focuses.

In summary, various embodiments have been described of a multi-sector scanner ultrasonic imaging system for real time lensless B-scan ultrasonic imaging. This high speed acoustic imaging system uses an electronically controlled, steered ultrasound beam capable of both translating and oscillating motions. As compared to the prior art single-sector scanner, the multi-sector scanner is characterized by an increase in the range of total viewing angles which improves reception of specular reflections and reduces shadowing. Also, the basic depth resolution of the system is available over a wider range of target viewing angles, so less reliance on the generally poorer lateral resolution of the system is required in image formation. The various forms of the invention can be built with conventional transducer and solid state electronic components such as piezoelectric transducers, operational amplifiers, etc.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. An improved multi-sector scanner ultrasonic imaging system comprising:
    linear transducer array means for making overlapping sector scans including a plurality of electroacoustic transducer elements divisible into multiple sub-arrays of active elements which have origin points spaced longitudinally along the array and which are each operable to transmit angulated acoustic beams and to detect received echoes and perform a sector scan,
    switch means for connecting said sub-arrays of active elements in sequence to a plurality of transmitting and receiving channels for generating transducer element excitation pulses after predetermined time delays and for delaying received echo electrical signals for predetermined time delays,
    means for controlling the time delays in said transmitting and receiving channels to steer the transmitted acoustic beam at multiple angles relative to the normal to each sub-array and to focus the received echoes, and
    means for summing the delayed echo signals for the plural channels connected to each sub-array and for processing and displaying the summed signals as a visual image of the insonified object region,
    wherein a sub-array of active transducer elements for forming a transmitting acoustic beam has a smaller number of elements than a sub-array of active elements for detecting the received echoes, and the number of transmitting channels is at least equal to the number of active elements in a transmitting sub-array while the number of receiving channels is at least twice the number of active elements in a receiving sub-array, said switch means being operative to connect said transmitting and receiving channels to the multiple transmitting and receiving sub-arrays in sequence.

2. An improved multi-sector scanner ultrasonic imaging system comprising:
    a single linear transducer array for making overlapping sector scans including a plurality of electroacoustic transducer elements divisible into multiple sub-arrays of contiguous active elements which have origin points spaced longitudinally along the array and which are each operative to generate angulated acoustic beams and to detect received echoes and perform a wide angle sector scan,
    switch means for connecting said sub-arrays of active elements in sequence to a plurality of transmitting and receiving channels for sequentially generating transducer excitation pulses after predetermined time delays and for delaying received echo electrical signals for varying predetermined time delays,
    means for controlling the time delays in said transmitting and receiving channels to steer the transmitted acoustic beams at many angles relative to the normal to each sub-array and to focus the received echoes, and means for summing the delayed echo signals for the plural channels connected to each sub-array and for processing and displaying the summed echo signals in real time on a cathode ray tube as a visual image of the insonified object region.

3. The ultrasonic imaging system according to claim 2 wherein each transmitting channel is comprised by a digital timer and a transmit pulser, said digital timers being preset to time predetermined intervals at the end of which a trigger signal is fed to the associated transmit pulser to generate the transducer element excitation pulse, and each receiving channel is comprised by the series combination of an amplifier and an analog delay circuit.

4. An improved multi-sector scanner ultrasonic imaging system comprising:
   a linear transducer array for making overlapping sector scans including a plurality of equally spaced electroacoustic transducer elements divisible into multiple sub-arrays of contiguous active elements which have origin points spaced longitudinally along the array and which are each operative to generate angulated acoustic beams and to detect received echoes and perform a sector scan,
   switch means for connecting said sub-arrays of active elements in sequence to a plurality of transmitting and receiving channels for sequentially generating transducer excitation pulses after predetermined time delays and for delaying received echo electrical signals for varying predetermined time delays,
   means for controlling the time delays in said transmitting and receiving channels to steer the transmitted acoustic beams at multiple angles relative to the normal to each sub-array and to focus the received echoes, and
   means for summing the delayed echo signals for the plural channels connected to each sub-array and for processing and displaying the summed echo signals in real time on a cathode ray tube as a visual image of the insonified object region,
   wherein said transmitting channels are comprised by a reversible digital shift register having a stage for each channel with an output from each stage coupled to a transmit pulser for generating the transducer element excitation pulses, a source of scan pulses coupled by switches to either end of said shift register, and a variable frequency clock connected to couple clock pulses to the shift register stages at a frequency determined by a control circuit to thereby control the time delays in the transmitting channels.

5. The ultrasonic imaging system according to claim 4 wherein said receiving channels are comprised by a reversible digital shift register having a stage for each channel with an output from each stage coupled to a first analog switch which is in turn connected to an analog storage element and then to a second analog switch, a source of scan pulses coupled by switches to either end of said shift register, a variable frequency clock connected to couple clock pulses to the shift register stages at a frequency determined by a control circuit to threby control the time delays in the receiving channels, said first analog switch gating the received echo signal to the analog storage element upon shifting of the scan pulse to the respective stage, and means for simultaneously opening all of said second analog switches to feed the stored echo signals to said summing means.

6. An improved multi-sector scanner ultrasonic imaging system comprising:
   a linear transducer array for making overlapping sector scans including a plurality of equally spaced electroacoustic transducer elements divisible into multiple sub-arrays of contiguous active elements which have origin points spaced longitudinally along the array and which are each operative to generate angulated acoustic beams and to detect received echoes and perform a sector scan,
   switch means for connecting said sub-arrays of active elements in sequence to a plurality of transmitting and receiving channels for sequentially generating transducer excitation pulses after predetermined time delays and for delaying received echo electrical signals for varying predetermined time delays,
   means for controlling the time delays in said transmitting and receiving channels to steer the transmitting acoustic beams at multiple angles relative to the normal to each sub-array and to focus the received echoes, and
   means for summing the delayed echo signals for the plural channels connected to each sub-array and for processing and displaying the summed echo signals in real time on a cathode ray tube as a visual image of the insonified object region,
   wherein said receiving channels and means for controlling the time delays in the receiving channels comprise a plurality of sets of analog charge coupled device delay lines of different lengths which are combined to achieved graduated time delays in the various channels, and a variable frequency clock connected to each set of analog delay lines and supplying clock pulses thereto, said clocks operating at different frequencies.

7. An improved multi-sector scanner ultrasonic imaging system comprising:
   a linear transducer array for making overlapping sector scans including a plurality of equally spaced electroacoustic transducer elements divisible into multiple sub-arrays of contiguous active elements which have origin points spaced longitudinally along the array and which are each operative to generate angulated acoustic beams and to detect received echoes and perform a sector scan,
   switch means for connecting said sub-arrays of active elements in sequence to a plurality of transmitting and receiving channels for sequentially generating transducer excitation pulses after predetermined time delays and for delaying received echo electrical signals for varying predetermined time delays,
   means for controlling the time delays in said transmitting and receiving channels to steer the transmitted acoustic beams at multiple angles relative to the normal to each sub-array and to focus the received echoes, and
   means for summing the delayed echo signals for the plural channels connected to each sub-array and for processing and displaying the summed echo signals in real time on a cathode ray tube as a visual image of the insonified object region,
   wherein said means for processing and displaying the summed echo signals includes a peak detecting scan converter for displaying on the cathode ray tube the echo signals with the largest amplitude in overlapping areas of the sector scans.

8. An improved multi-sector scanner ultrasonic imaging system comprising:

a single linear transducer array for making overlapping sector scans including a plurality of equally spaced electroacoustic transducer elements divisible into multiple sub-arrays of contiguous active elements with the origin points of the sub-arrays spaced longitudinally along the array, each sub-array being operable to transmit angulated acoustic beams, detect the received echoes, and perform a sector scan, a plurality of transmitting channels and receiving channels for generating transducer element excitation pulses after predetermined time delays and for amplifying and delaying received echo electrical signals for predetermined time delays, sector select switch means for coupling the multiple sub-arrays of active elements in sequence to prescribed transmitting and receiving channels, means for controlling the time delays in the transmitting channels and receiving channels to at least steer the transmitting beam at many angles relative to the normal at the center of each sub-array and also to at least focus the received echoes at a constant range, means for summing the delayed echo signals at the plural receiving channels for an active sub-array, and means for processing and displaying in real time only the largest amplitude summed echo signal at every image point as a visual image of the insonified object region.

9. The ultrasonic imaging system according to claim 8 wherein each sub-array for receiving has at least twice the number of transducer elements as the associated sub-array for transmitting, the number of receiving channels is at least twice as great as the number of transducer elements in the receiving sub-array and the number of transmitting channels is less than the number of receiving channels, said sector select switch means being operative to connect at least two receiving channels in parallel to each receiving sub-array transducer element, and said means for controlling the time delays in the receiving channels being operative to provide different time delays in the parallel receiving channels to focus the received echoes originating at different locations.

10. The ultrasonic imaging system according to claim 9 wherein each transmitting channel is comprised by a digital timer and a transmit pulser, said digital timers being preset to time predetermined intervals at the end of which a trigger signal is fed to the associated transmit pulser to generate a transducer element excitation pulse, and each receiving channel is comprised by the series combination of an amplifier and an analog delay circuit.

11. The ultrasonic imaging system according to claim 8 wherein said transmitting channels are comprised by a reversible digital shift register having a stage for each channel with an output from each stage coupled to a transmit pulser for generating the transducer excitation pulses, a source of scan pulses coupled by switches to either end of said shift register, and a variable frequency clock connected to couple clock pulses to the shift register stages at a frequency determined by a control circuit to thereby control the time delays in the transmitting channels.

12. The ultrasonic imaging system according to claim 8 wherein said receiving channels are comprised by a reversible digital shift register having a stage for each channel with an output from each stage coupled to a first analog switch which is in turn connected to an analog storage element and then to a second analog switch, a source of scan pulses coupled by switches to either end of said shift register, a variable frequency clock connected to couple clock pulses to to shift register stages at a frequency determined by a control circuit to thereby control the time delays in the receiving channels, said first analog switch gating the received echo signal to the analog storage element upon shifting of the scan pulse to the respective stage, and means for simultaneously opening all of said second analog switches to feed the stored echo signals to said summing means.

13. The ultrasonic imaging system according to claim 8 wherein said receiving channels and means for controlling the time delays in the receiving channels comprise a plurality of sets of analog charge coupled device delay lines of different lengths which are combined to achieve graduated time delays in the various channels, and a variable frequency clock connected to each set of analog delay lines and supplying clock pulses thereto, said clocks operating at different frequencies.

14. The ultrasonic imaging system according to claim 8 wherein said means for processing and displaying the summed echo signals includes a peak detecting scan converter for displaying on a cathode ray tube the echo signals with the largest amplitude in overlapping areas of the sector scans.

* * * * *